(12) United States Patent
Lassota (10) Patent No.: US 8,881,948 B1
(45) Date of Patent: Nov. 11, 2014

(54) LIQUID BEVERAGE CONCENTRATE MIXING BEVERAGE DISPENSER AND METHOD

(75) Inventor: Zbigniew G. Lassota, Long Grove, IL (US)

(73) Assignee: Food Equipment Technologies Company, Inc., Lake Zurich, IL (US)

(*) Notice: Subject to any disclaimer, the term of this patent is extended or adjusted under 35 U.S.C. 154(b) by 782 days.

(21) Appl. No.: 12/952,287

(22) Filed: Nov. 23, 2010

Related U.S. Application Data (60) Provisional application No. 61/264,083, filed on Nov. 24, 2009.

(51) Int. Cl.
*B67D 7/74* (2010.01)
*B67D 7/06* (2010.01)
*A47J 31/00* (2006.01)

(52) U.S. Cl.
USPC .................. 222/129.1; 222/144.5; 222/129.3; 222/129.4; 99/279; 99/290; 99/323.3

(58) Field of Classification Search
USPC ............. 222/129, 129.1, 129.2, 129.3, 129.4, 222/144, 144.5, 56, 63, 145.5; 99/279, 290, 99/323.3
See application file for complete search history.

(56) References Cited

U.S. PATENT DOCUMENTS

| 4,886,190 | A  | * | 12/1989 | Kirschner et al. | 222/57 |
| 5,588,557 | A  | * | 12/1996 | Topar | 222/54 |
| 6,837,397 | B2 | * | 1/2005 | Lassota | 222/129.3 |
| 7,048,149 | B1 | * | 5/2006 | Lassota | 222/129.3 |
| 2003/0071061 | A1 | * | 4/2003 | Lassota | 222/129.3 |
| 2007/0068969 | A1 | * | 3/2007 | Orzech et al. | 222/214 |
| 2008/0083780 | A1 | * | 4/2008 | Romanyszyn et al. | 222/129.1 |

* cited by examiner

*Primary Examiner* — Frederick C Nicolas
*Assistant Examiner* — Stephanie E Williams
(74) *Attorney, Agent, or Firm* — Law Offices of Potthast & Associates

(57) ABSTRACT

An automated mixing drink dispenser (10) establishes a preselected feed rate of concentrate from a concentrate hopper (42) and ratio of concentrate to mixing water fed into a mixing chamber (42) through the Venturi effect created by swirling water fed into a mixing chamber (42) at a preselected water pressure (66) and preselected regulated flow rate (68) associated with the preselected feed rate of the concentrate. Concentrate is fed to a mixing chamber (42) from a concentrate hopper (42) having an open drain hole (50) openly connected to the mixing chamber (42). A stirring mechanism (106, 100, 101, 102, 104) mechanically mixes the concentrate within the concentrate hopper (42) to maintain a uniform density and viscosity and a gas pressure mechanism (92, 94, 96, 86) maintains a uniform head pressure of concentrate to facilitate maintenance of the preselected concentrate flow rate over time. Nitrogen gas in air is pumped through a nitrogen passing filter to fill the space (90) above the concentrate to both maintain head pressure and to reduce deterioration of the concentrate due to interaction with oxygen.

29 Claims, 4 Drawing Sheets

Fig. 10

LIQUID BEVERAGE CONCENTRATE MIXING BEVERAGE DISPENSER AND METHOD

CROSS-REFERENCE TO RELATED APPLICATIONS

This application claims the benefit under 35 U.S.C. 119(e) of U.S. provisional patent application No. 61/264,083, filed Nov. 24, 2009.

BACKGROUND OF THE INVENTION

1. Field of the Invention

This invention generally relates to an electric, automatic mixing drink dispenser for mixing liquid drink concentrate with water to make a mixed drink on demand and methods of mixing and dispensing drinks with such a mixing drink dispenser 2. Discussion of the Prior Art Electrical, commercial mixing drink dispensers of type that mix liquid drink concentrate with carbonated or noncarbonated mixing water on demand to make and dispense a mixed drink are well known, but suffer from a number of disadvantages. When a manual switch is actuated, mixing water and drink concentrate from a concentrate hopper are injected into a mixing chamber where they are mixed together to make a mixed beverage and then dispensed. In some cases, actuation of the start switch starts a timer that fixes a preselected total quantity of mixed drink to be dispensed. In other dispensers, the mixing and dispensing proceeds continuously as long as a dispense switch is manually held in an actuated state.

In some cases, the mixing is achieved with rotating mixing blades that disadvantageously become dirty and need to be cleaned periodically or become worn and need replacement. In some cases, a drain valve, subject to wear and clogging may be used to block dispensing of the beverage from the mixing chamber until for a preselected time period until fully mixed. The concentrate is generally maintained within a concentrate hopper with a drain hole, while the mixing water is generally obtained from a public source of pressurized water from a faucet. Both the mixing water and the concentrate are fed to a proportional valve to maintain a preselected ratio of concentrate to mixing water over the mixing of the many mixed drinks that are made from the a single hopper load of concentrate. Again, such proportionate valves are expensive and require periodic cleaning and maintenance if the concentrate to mixing water is to be maintained. Other computer controlled valves based on mixing water quantity measurements and concentrate quantity measurement may also be used, but the need for a valve for each of the concentrate and water is still required as well as the higher cost of a computer and associated interfaces.

In mixing drink dispensers that rely upon the measured length of time that a concentrate outlet valve is open to determine the quantity of concentrate that is dispensed to the mixing chamber, a problem exists with respect to maintaining the rate of concentrate dispensing because of the lowering of the concentrate head pressure at the concentrate hopper drain hole as the concentrate in the hopper is gradually depleted and the level becomes lower. As the level of the concentrate in the hopper becomes lower, the head pressure forcing the concentrate out of the drain hole becomes less and the rate of concentrate flow gradually decreases. Such change in concentrate flow rates disadvantageously results in a non-uniform drink product which may be too strong when the concentrate hopper is first filled and is too weak when the concentrate hopper is nearly depleted.

The inventor has also noted that the concentrates fail to maintain a uniform density throughout the normal periods of storage within the concentrate hopper between concentrate refills. Consequently, even if the same fluid volume per drink is maintained over the plurality of drinks that are made, the uniformity of flavor intensity varies. Over time, the heavier elements of the concentrate gradually settle toward the bottom. Accordingly, after a period of time, the first drinks are made with a more highly concentrated concentrate than the drinks that are made later.

Another problem noted by the inventor with existing mixing drink dispensers is that in some cases the same concentrate may be stored within the drink dispenser over a substantial length of time. Even with cooling of concentrate, this long term storage of the concentrate exposed to the oxygen in the air causes gradual deterioration of the taste, smell and other flavor elements of the concentrate and eventually spoilage due to mold and aerobic bacteria.

SUMMARY OF THE INVENTION

Accordingly, it is an object of the present invention that overcomes or ameliorates the disadvantages of the known concentrate mixing drink dispensers noted above.

The is objective is achieved in part by providing a mixing drink dispenser with a mixing chamber for receipt of mixing liquid drink concentrate with water for mixing together into a beverage, said mixing chamber having an upper cylindrical section with a water inlet directed for flow of streaming water tangentially against an interior surface of the cylindrical section at a first level, and a concentrate inlet directed for flow of streaming concentrate generally perpendicularly against the interior surface at a second level beneath the first level; a source of mixing water connected with the water inlet, and a concentrate hopper for holding liquid drink concentrate connected with a drain hole connected to the concentrate inlet.

In the preferred embodiment, the mixing chamber includes a lower section joined to a bottom of the upper cylindrical section having a drain hole with a diameter substantially smaller than a diameter of the upper cylindrical section. The lower section has an interior lower surface joined to the interior surface of the upper cylindrical section at a location beneath the second level and extends inwardly and downwardly to the drain hole. This inwardly, downwardly lower section advantageously speeds the flow beverage around a perimeter for enhanced mixing. Also, the interior lower surface is at least a partly planer surface to increase turbulence for improved mixing.

Preferably, the concentrate inlet is an open end of an elongate concentrate inlet tube located within the mixing chamber and extending from one side of the upper cylindrical section toward a side opposite the one side to locate the open end directly opposite a concentrate inlet closure at another side of the upper cylindrical section diametrically opposite the sealed tube opening at the one side. The concentrate inlet is slid into engagement with the inlet closure or the closure is moved into engagement with the inlet to close the inlet when beverage is not being mixed. In the case of a movable concentrate inlet tube, the stationary closure member is an inwardly directed cone that facilitates the rapid spread of the concentrate over the interior wall from which it is washed by a relatively elevated swirling stream of mixing water created by the tangentially directed water inlet.

The object of the invention is also acquired in part by provision of a mixing drink dispenser, having a mixing chamber; a concentrate hopper; means for selectively passing mixing water into the mixing chamber from a source of mixing water at a preselected water flow rate and preselected water pressure required to establish a preselected flow rate of concentrate into the mixing chamber; means for selectively passing concentrate contained within the hopper to the mixing chamber at a preselected flow rate established at least in part by the preselected water flow rate and the preselected water pressure.

In the preferred embodiment, the mixing drink dispenser has a start switch, and the selective water passing means and the concentrate passing means are both actuated simultaneously in response to actuation of the start switch. Passage of concentrate and water into the mixing chamber and associated mixing continues so long as the switch is held in an actuated state. An adjustable water pressure regulator connected between the source of mixing water and the mixing chamber regulates the water pressure of the mixing water while an adjustable flow rate regulator establishes a preselected flow rate of the mixing water. The preselected flow rate and water pressure of the inlet water establishes the flow rate of the concentrate into mixing chamber and thus also determines the ratio of concentrate to mixing water.

Also, the object of the invention is partly obtained by providing in a mixing drink dispenser having a source of mixing water, a hopper for holding drink concentrate for mixing with the water to make a consumable drink and a mixing chamber within which the mixing water and the concentrate are fed for mixing together into the beverage, an improvement having means for selectively passing mixing water under pressure into the mixing chamber; means openly connecting the concentrate hopper with the mixing chamber; means for maintaining a preselected head pressure within the mixing chamber to maintain a uniform flow rate of concentrate for different levels of concentrate within the mixing chamber for a given mixing water flow rate and a given mixing water pressure. In the preferred embodiment, the head pressure maintaining means includes a relatively air tight closure for a load opening of the mixing chamber, a sensor for detecting the gaseous pressure within the mixing chamber above the concentrate, a gas pump controlled by the sensor for pumping gas into mixing chamber when the detected pressure falls beneath a preselected minimum level until the pressure rises to another preselected maximum level higher than the one preselected level.

Achievement of the objective is also acquired in part by providing in a mixing drink dispenser having a source of mixing water, a hopper for holding drink concentrate for mixing with the water to make a consumable drink and a mixing chamber within which the mixing water and the concentrate are fed for mixing together into the beverage, an improvement having means for selectively passing mixing water under pressure into the mixing chamber; means openly connecting the concentrate hopper with the mixing chamber; and means for mixing concentrate in the hopper to maintain a substantially uniform density and viscosity of all the concentrate to help maintain a uniform flow rate of concentrate out of the concentrate hopper over time.

Preferably, the concentrate mixing means includes a mixing blade mounted on a rotary base member mounted on the bottom of the hopper for relative rotary movement, an electric rotary motor mounted outside of the hopper with a rotor located adjacent to the bottom of the hopper and the rotary base member, and means for toolessly linking the rotor with the rotary base to rotate the rotary base with rotation of the rotor.

Moreover, the objective of the invention is partly achieved by providing a mixing drink dispenser having a source of mixing water, a hopper for holding drink concentrate for mixing with the water to make a consumable drink and a mixing chamber within which the mixing water and the concentrate are fed for mixing together into the beverage, with an improvement having means for selectively passing mixing water under a preselected pressure into the mixing chamber, means openly connecting the concentrate hopper with the mixing chamber and means for maintaining the mixing chamber above the concentrate substantially oxygen free relative to air.

Preferably, the inert gas is nitrogen, and the maintaining means includes a gas pump for pumping nitrogen gas into the mixing chamber from the outlet of a nitrogen passing filter that passes nitrogen into the mixing chamber but blocks passage of oxygen. The maintaining means also includes a cover for an open top load opening of the mixing chamber that is sufficiently gas tight to maintain the nitrogen gas within the mixing chamber and to keep oxygen laden air from leaking into the mixing chamber.

Additionally, the objective is partly acquired by provision of an automated mixing drink dispenser, with means for feeding water into a mixing chamber at a preselected water pressure and regulated flow rate, means for passing concentrate to the mixing chamber from a concentrate hopper having an open drain hole openly connected to the mixing chamber at a preselected flow rate at least partly determined by the preselected water pressure and regulated flow rate, means for mechanically mixing the concentrate within the concentrate hopper to maintain a uniform density and viscosity to facilitate maintenance of the preselected concentrate flow rate over time and means for maintaining a preselected head pressure of the concentrate in the hopper to facilitate maintenance of the preselected concentrate flow rate over time.

Preferably, means associated with the preselected head, pressure maintaining means for also fills the concentrate hopper with an inert gas. The pressurizing means includes a nitrogen filter and a pump for drawing nitrogen from the air through the filter and into the concentrate hopper.

Additionally, the objective is achieved in part by providing a method of mixing and dispensing a mixed drink with a mixing drink dispenser, by performance of the steps of injecting mixing water from a source of water through a tangentially directed water inlet of an upper cylindrical section of a mixing chamber against an interior surface of the cylindrical section at a first level to create a spiraling flow of streaming water around the interior surface and injecting concentrate from a drain hole of a concentrate hopper though a concentrate inlet of the mixing chamber directed for flow of streaming concentrate generally radially against the interior surface at a second level beneath the first level.

Also, achievement of the object is acquired partly by providing a method of mixing and dispensing a mixed drink with a mixing drink dispenser, by performance of the steps of selectively passing mixing water into a mixing chamber from a source of mixing water at a preselected water flow rate and preselected water pressure required to establish a preselected flow rate of concentrate into the mixing chamber and selectively passing concentrate contained within the hopper to the mixing chamber at a preselected flow rate established at least in part by the preselected water flow rate and the preselected water pressure.

Acquisition of the object of the invention is also partly obtained by providing a method of mixing and dispensing a mixed drink with a mixing drink dispenser having a source of mixing water, a hopper for holding drink concentrate for mixing with the water to make a consumable drink and a mixing chamber within which the mixing water and the concentrate are fed for mixing together into the beverage, by performing the steps of selectively passing mixing water under pressure into the mixing chamber; openly connecting the concentrate hopper with the mixing chamber and maintaining a preselected head pressure within the mixing chamber to maintain a uniform flow rate of concentrate for different levels of concentrate within the mixing chamber for a given mixing water flow rate and a given mixing water pressure.

Moreover, the object is partly achieved by providing a method of mixing and dispensing a mixed drink with a mixing drink dispenser having a source of mixing water, a hopper for holding drink concentrate for mixing with the water to make a consumable drink and a mixing chamber within which the mixing water and the concentrate are fed for mixing together into the beverage, through performance of the steps of selectively passing mixing water under pressure into the mixing chamber, connecting the concentrate hopper with the mixing chamber; and mixing concentrate in the hopper to maintain a substantially uniform density and viscosity of all the concentrate to help maintain a uniform flow rate of concentrate out of the mixing chamber over time.

Additionally part achievement of the invention is obtained by providing a method of mixing and dispensing a mixed drink with a mixing drink dispenser having a source of mixing water, a hopper for holding drink concentrate for mixing with the water to make a consumable drink and a mixing chamber within which the mixing water and the concentrate are fed for mixing together into the beverage, by performance of the steps of selectively passing mixing water under a preselected pressure into the mixing chamber; openly connecting the concentrate hopper with the mixing chamber and maintaining the mixing chamber above the concentrate substantially oxygen free relative to air.

Preferably, the method includes the steps of pumping nitrogen gas into the mixing chamber from the outlet of a nitrogen passing filter that passes nitrogen into the mixing chamber but blocks passage of oxygen; and covering an open top load opening of the mixing chamber with means sufficiently gas tight to maintain the nitrogen gas within the mixing chamber and to keep oxygen laden air from leaking into the mixing chamber.

The object is also partly acquired by providing a method of mixing and dispensing a mixed drink with a mixing drink dispenser, by performance of the steps of feeding water into a mixing chamber at a preselected water pressure and regulated flow rate; passing concentrate to the mixing chamber from a concentrate hopper having an open drain hole openly connected to the mixing chamber at a preselected flow rate at least partly determined by the preselected water pressure and regulated flow rate, mechanically mixing the concentrate within the concentrate hopper to maintain a uniform density and viscosity to facilitate maintenance of the preselected concentrate flow rate over time and maintaining a preselected head pressure of the concentrate in the hopper to facilitate maintenance of the preselected concentrate flow rate over time.

BRIEF DESCRIPTION OF THE DRAWINGS

The forgoing objects, features and advantages of the liquid beverage concentrate mixing beverage dispenser and methods of the present invention will be described and others made apparent in the detailed description given below with reference to the several figures of the drawings, in which.

DETAILED DESCRIPTION

Figure 1:
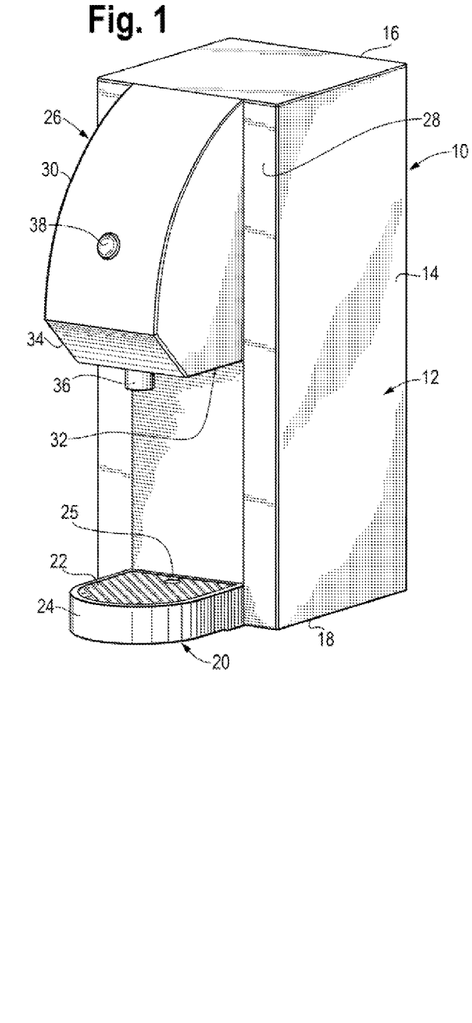
FIG. 1 is a perspective view of a preferred embodiment of the liquid concentrate mixing and dispenser, or mixed drink dispenser, of the present invention.
Figure 2:
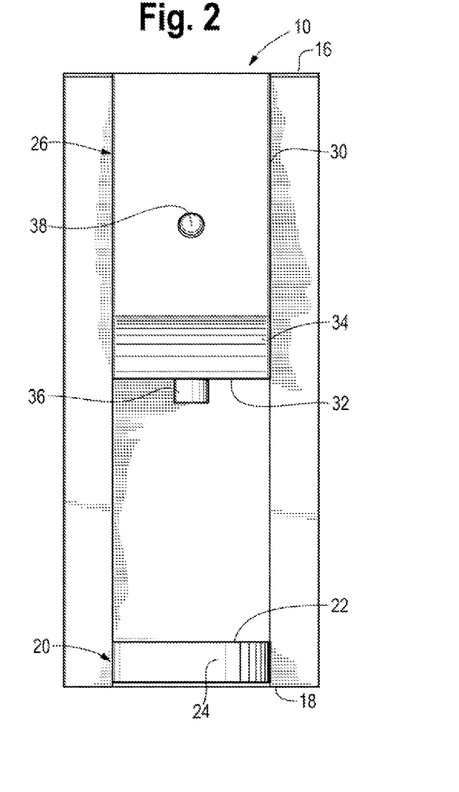
FIG. 2 is a front elevation view of the mixed drink dispenser of FIG. 1.

Referring now to FIGS. 1 and 2, a preferred embodiment of the drink dispenser 10 of the present invention is seen to include a housing 12 with an aft concentrate housing section 14 with a generally rectangular cross section, a top 16 and a bottom 18. Extending forwardly from the front of the bottom 18 is a generally semicircular drip tray 20 with a removable, perforated cup support 22 supported at the top of an upwardly facing drip container body 24. A finger hole 25 in the cup support 22 functions as a handle to facilitate removal of the cup support 22 from the top of drip container body 24 for cleaning.

Located above the cup support 22 is an overhanging, forward, upper, dispenser housing section 26 cantilever mounted to a central, upper part of the front 28 of the aft housing 14. The forward, upper dispenser housing section 26 has a curved front 30, a flat bottom 32 and a downwardly, inwardly slanted beveled section 34 extending between the front 30 and the bottom 32. Extending downwardly from the bottom 32 is a beverage dispense tube 36 from which the beverage is dispensed into a suitable serving container, such as a glass or cup (not shown) supported on the cup support 22.

The beverage is dispensed when a push-button dispense switch 38 is pushed inwardly to a dispense position and continues to be dispensed while the push-button dispense switch 38 is manually held in the inward dispense position. The push-button switch is spring loaded to return to an outward, off, or valve closed, position when not being manually held in the inward dispense position. Consequently, when the user releases the dispense push-button switch 38, dispensing of the beverage automatically ceases.

Figure 3:
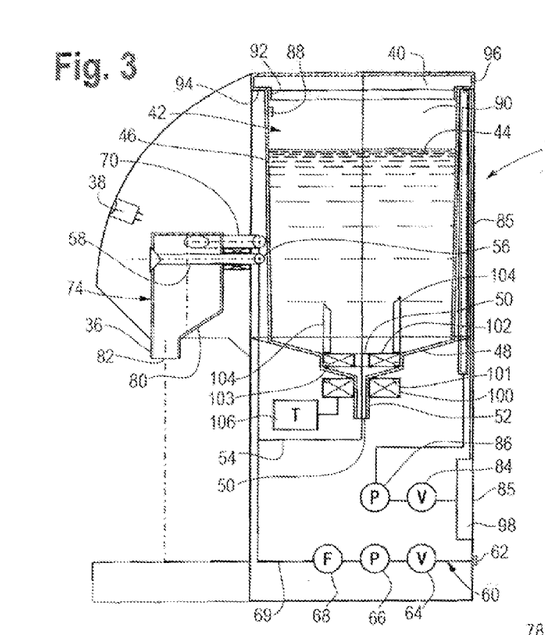
FIG. 3 is a sectional side elevation view of one from of the drink dispenser.
Figure 4:
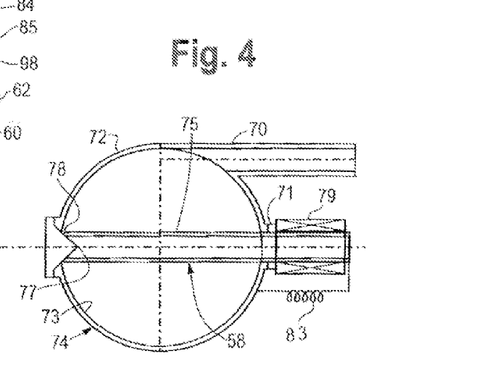
FIG. 4 is sectional plan view of the mixing chamber of the drink dispenser of FIG. 3 in which a water dispense valve is in a closed position.
Figure 5:
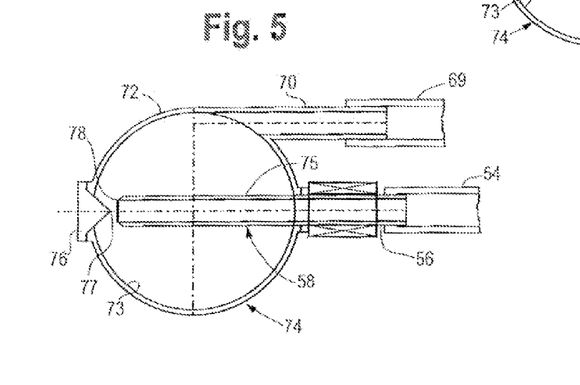
FIG. 5 is a sectional plan view of the mixing chamber of drink dispenser of FIG. 3 in which the water dispense valve is in an open position.

Referring now to FIGS. 3-5, the internal workings of the drink dispenser 10 is described. As seen in FIG. 3, the aft concentrate housing section 12 protectively houses a concentrate hopper 42 within which a supply of liquid beverage concentrate 44 is temporarily stored before being dispensed.

The concentrate hopper 42 has a cylindrical upper section 46 and a lower conical section 48 that slants downwardly and inwardly to a centrally located, downwardly extending, hollow, cylindrical tube connector 52 with a concentrate drain hole 50. One end of a flexible Teflon® tube 54, or the like, schematically illustrated by a single line, is connected to the concentrate tube connector 52. The flexible concentrate tube 54 is directly connected at its opposite end to an inlet connector 56 of a concentrate solenoid controlled valve 58, best seen in FIGS. 5 and 6. The outlet of the solenoid controlled valve is located within a mixing chamber 74, as seen in FIG. 3.

A water line 60, schematically illustrated by a single line, is directly connected at an inlet 62 to a public water supply through a suitable flexible hose, not shown. The inlet 62, in turn, is connected to an inlet of a solenoid controlled water inlet valve 64. The outlet of the solenoid controlled water inlet valve 64, in turn, is connected in series with both a pressure regulator 66 and a flow regulator 68. The output of the flow regulator 68 is connected directly to a water inlet connector 70 via an elongate flexible tube 69. As best seen in FIGS. 4 and 5, the water inlet connector 70 is a rigid, elongate, hollow, cylindrical tube that extends outwardly from a side of the cylindrical top section 72 of the mixing chamber 74 in a generally tangential direction.

The outlet 69 merges into the interior cylindrical sidewall of the mixing chamber 74. This entry location of the water inlet connector 70 causes the water to enter the cylindrical top section 72 in a tangential direction and then swirl around the interior cylindrical surface of the cylindrical top section 72. Centrifugal forces press the water against the upper interior surface and tends to hold the water there, but gravity causes the swirling water to gradually fall downwardly along the interior side. Advantageously, a spiraling, swirling vortex of water closely covering the interior side of the cylindrical top section 72 that moves downwardly is thereby created.

Unlike the tangential connection used for the water, the solenoid controlled concentrate valve 58 has an outlet 78 that directly faces in a radial direction at a fixed conical valve closure 76. Advantageously, the conical valve closure 76 performs a dual function. The peak 77 of conical valve closure 76 is directly aligned with and located opposite and adjacent to the concentrate outlet 78. Accordingly, when the concentrate valve 58 is struck by a stream of concentrate, the conical shape of the valve closure 76 splits and widens the concentrate stream to causes the concentrate to splatter and spray against the sides of the conical valve closure 76 and the surrounding interior surface 73 of the cylindrical top section 72. The concentrate is thus spread out in an area directly beneath and forward of the entry point of the falling swirling water from the water outlet of the water inlet valve 70 for enhanced and rapid mixing of the beverage concentrate with the mixing water. Once the water drops down to and impacts against the conical, concentrate valve closure 76 and the surrounding concentrate, swirling laminar flow of the water ends and the fluid motion converts to a more turbulent flow ideal for mixing.

As the swirling water drops down to and through a non-cylindrical lower section the reduced diameter causes an increase in velocity of the mixed water and concentrate. Moreover, the non-cylindrical lower section 81 has a rearwardly located section 80 that is planer. This planer section 80 creates additional source of turbulence, and because the planer section 80 slants inwardly towards the opposite side, the volume containing the mixed beverage is reduced and the mixing more concentrated. Finally, after complete mixing, the mixed beverage falls downwardly toward a drain hole 82 at the cylindrical side of the mixing chamber 74 that is opposite planer section 80. The drain hole 82 is connected to a top, distal end of the beverage dispense tube 36. Thus, first the swirling water captures the concentrate splattered on the interior surface and then vigorously mixes occurs as the mixture moves downwardly and faster and more turbulent flow occurs.

In keeping with an important aspect of the invention, by controlling both the water pressure, with the pressure regulator 66, and the water flow rate, with the flow regulator 68, the mixing ratio between drink concentrate and water is controlled without the need of proportional valves or other measuring devices. In addition to the viscosity and density of the liquid concentrate, the size of the concentrate drain hole 50, frictional characteristics of the interior of the concentrate tube 54 and other factors remain fixed. In accordance with the invention, the amount of concentrate that flows into the mixing chamber 74 is determined, in part, by a Venturi effect created by the entry of the water into the mixing chamber 74. The degree that this Venturi effect is created depends upon the rate and pressure at which the water enters the mixing chamber 74. Thus, the rate at which the concentrate enters the mixing chamber 74 is dependent upon the rate and pressure at which the water enters the mixing chamber 74. The rate of entry and pressure of the water, once the water inlet valve 64 is opened, is determined by the pressure regulator 66 and the flow regulator 68. Accordingly, the drink ratio of concentrate to mixing water may be controlled by appropriate settings of the flow rate and water pressure.

Specifically, in keeping with the method of the invention, the pressure regulator 66 and flow regulator 68 are preset to preselected limits empirically determined to establish a preselected concentrate flow rate, or mixing ratio. Different drink concentrates may have different levels of viscosity and density thus different regulation settings may be needed for different concentrates to achieve the same mixing ratio. Likewise, different regulation settings are needed to achieve different mixing ratios for the same concentrate or different concentrates with the same flow characteristics.

In keeping with another important aspect of the present invention, another problem with known mixing drink dispensers is overcome. The problem noted by the inventor is that as the level of the concentrate 44 becomes lower during dispensing of beverage from the drink dispenser 10, the head pressure within the concentrate decreases. Decreases of head pressure, without adjustment, results in decreased flow rate of the concentrate for given pressure and flow regulation settings. Disadvantageously, this reduced concentrate flow rate results in a gradual decline in the mixing ratio of concentrate to mixing water. Reduced mixing ration disadvantageously results in a corresponding weakening of the beverage as the level of the concentrate in the concentrate hopper 42 drops.

In accordance with the present invention, this problem is overcome by means of a head pressure regulation assembly that includes a gas pump 84 drawing ambient air through an inlet 85, a gas pressure regulator 86, and a concentrate hopper 42, gas pressure sensor 88 connected with the regulator 86. The head pressure regulation assembly automatically operates to regulate the gas pressure in the head space 90 above the concentrate 44 when the cover 40 is sealed closed.

Figure 6:
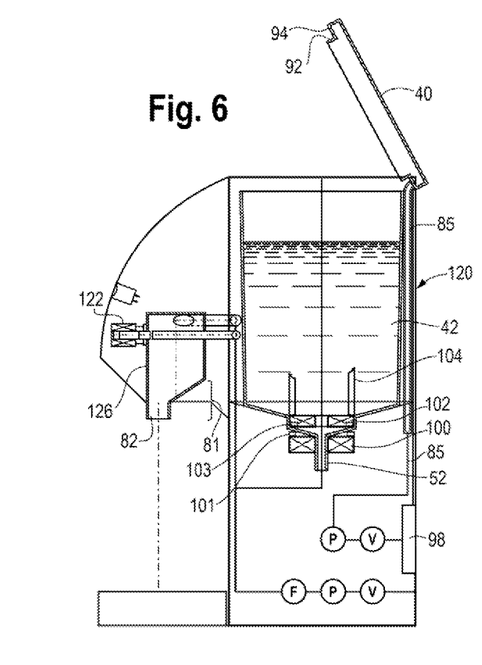
FIG. 6 is a sectional side elevation view of another from of the drink dispenser in which the top cover is opened and another type of dispense valve, different from that of FIGS. 3-5, is in a closed position.
Figure 7:
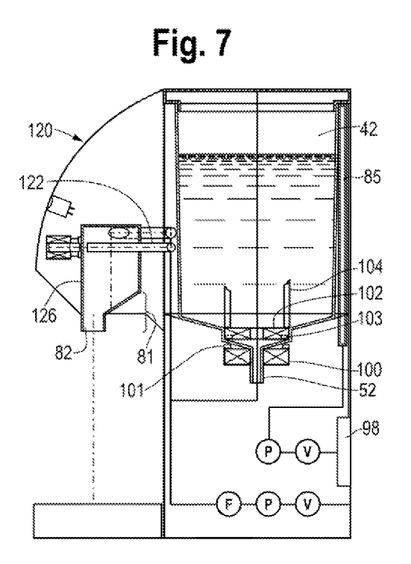
FIG. 7 is a sectional side elevation view, the same as that of FIG. 6, but in which the cover is closed and the other type of valve of FIG. 6 is in an open position.

In order to facilitate control the pressure, the cover 40 is preferably provided with a relatively air tight seal. As best seen in FIG. 6, the cover 40 has a neck 92 that extends into and fits snuggly against the interior surface at the top of the upper cylindrical section 46 of the concentrate hopper 42. In addition, an annular shoulder 94 formed between the neck 92 and an upper section 96 of the cover 40 presses downwardly onto the upwardly facing edge of the top of the concentrate hopper 42 to provide another air tight sealing surface. The annular shoulder is also preferably provided with an O-ring seal or other resilient sealing member or the like that presses against the top. When the cover 42 is closed, as shown in FIGS. 3 and 7, the relatively air tight seal, enables the gas pump 84 and the gas pressure regulator 86 to increase the pressure in head space 90 to a level greater than atmospheric pressure as needed to maintain a uniform concentrate flow rate regardless of the level of concentrate 44.

In the absence of gas being pumped into the head space 90, as the level of the concentrate goes down, the volume of the head space 90 increases. This increase in volume causes the pressure within the head space 90 to decrease. This pressure decrease is detected by the sensor pressure 88. When the pressure decreases to a preselected minimum level, a signal is sent to the gas pump 84. The gas pump continues to operate until the sensor 88 detects that the pressure in the head space has again been elevated to a preselected maximum level needed for uniform flow. After the pump 84 is turned off, the pressure again declines as the level of the concentrate 44 drops until it again reaches the minimum level which causes the gas pump 84 to again turn on.

In keeping with another aspect of the invention, the ambient air inlet 85 is preferably covered by a nitrogen filter 98 that filters out oxygen from the ambient air and passes only nitrogen through the pump 84 and regulator 86 to reduce the amount of oxygen in contact with the concentrate 44 within the head space 90. As best seen in FIG. 6, the flexible nitrogen gas line 85 passes into the neck 94 of the cover 40 and is passed to the head space 90 from the gas pump 86 though the cover 40, except when the cover is hinged open, as shown in FIG. 6. This reduction of oxygen helps to reduce the deterioration of the concentrate due to interaction with oxygen, which is a relatively active gas, as opposed to nitrogen, which is relatively inert and non-reactive with the concentrate. Consequently, the chemical integrity and original fresh flavor of the concentrate may be maintained for a much longer time as compared to when it unfiltered air is used to maintain the head pressure. Other inert gasses could be used but only nitrogen is plentiful, free and may be obtained by simple filtering.

Another problem with known concentrate drink dispensers that interferes with maintenance of uniform concentrate flow rates and control over the concentrate to mixing water ratio is that no compensation is provided for the non-homogeneity of the concentrate. With most concentrates, over a period of time, the heavier constituents of the concentrate gradually settle toward the bottom. This causes the density of the portion of the concentrate near the bottom to increase relative to that at the top and relative to the average density. This increase in density decreases the viscosity of the concentrate that is passed to the mixing chamber. The decreased viscosity tends to uncontrollably reduce the flow rate while also uncontrollably increasing the concentration of the concentrate. As the level goes down, the diminished remaining concentrate uncontrollably increases in viscosity while uncontrollably decreasing in concentration levels. This again disadvantageously results in a non-uniform beverage product being produced.

In accordance with the present invention, this problem is overcome by means of concentrate mixing assembly that includes an electrical motor 100 fixedly mounted within the upper cylindrical housing 42 and having hollow, central, electrical core though which the tube connector 52 is slidably received, as best seen in FIGS. 6 and 7. The electrical motor 100 located outside of the concentrate hopper 42 rotates about the tube connector 52 and carries fixed magnets or ferromagnetic elements, or magnetic elements, 101 which are also rotated. The fixed magnets or ferromagnetic elements 101 are magnetically attracted to mating ferromagnetic elements or fixed magnets, or magnetic elements, 103 of a blade rotor 102. The blade rotor 102 is rotatably mounted to rotate in a cylindrical housing section located beneath the conical section 48 of the concentrate hopper 42. Extending upwardly from the circumferential edge of the blade rotor 102 is a plurality of mixing blades 104. When the motor 100 is energized by an electrical timer switch 106, the motor 100 rotates the magnetic elements 101 and the magnetic link between magnetic elements 101 and the magnetic elements 103 carried by the blade rotor 102, cause the blade rotor to rotate 102. The rotation of the blades 104 mixes the concentrate 44 to maintain homogeneity and prevent settling of the concentrate 44. The electrical timer 106 may be set to different cycles, but generally, it has been found that mixing for a few minutes every few hours is sufficient to maintain the concentrate in a sufficiently homogenous condition.

Referring to FIG. 4, the solenoid controlled concentrate valve 58 is closed, as shown, when the solenoid 79 is not energized. In such case, a spring 83, schematically illustrated only in FIG. 4, automatically forces the distal open end 78 of the slidably mounted tube 75 against the conical valve closure 76. The conical valve closure 76 is fixedly mounted to the inside wall of the cylindrical section 46 of the mixing chamber 42 directly opposite the distal end 78. A water seal, preferably an O-ring 71, from a water tight seal between the sides of the tube 75 and the mourning hole in the side of the mixing chamber 42 through which it is slidably mounted.

Referring to FIG. 5, when the solenoid 79 is energized, a resultant electromagnetic force overcomes the spring bias provided by the spring 83, FIG. 4, and the tube 75 is moved to the open position in which the open end 78 is spaced laterally from the conical valve closure 76, as shown in FIG. 5. In this position, concentrate flows out of the end 78 at a rate determined by the water pressure regulator 66, the water flow regulator 86 and head pressure regulation assembly including the pressure sensor 88, the gas pump 84 and the gas pressure regulator 86.

Referring to FIG. 6-9, another embodiment of a drink dispenser 120 is shown which is substantially identical to the drink dispenser of FIG. 3 and which has an outward appearance identical to that of drink dispenser 10 shown in FIG. 3. The only difference is that a concentrate solenoid controlled valve 122 is employed that is different from the solenoid controlled valve 58 of FIGS. 5 and 6, and the mixing chamber 126 has a slightly different configuration to accommodate the differences in the valves 58 and 122. All other features are the same.

Figures 8, 9:
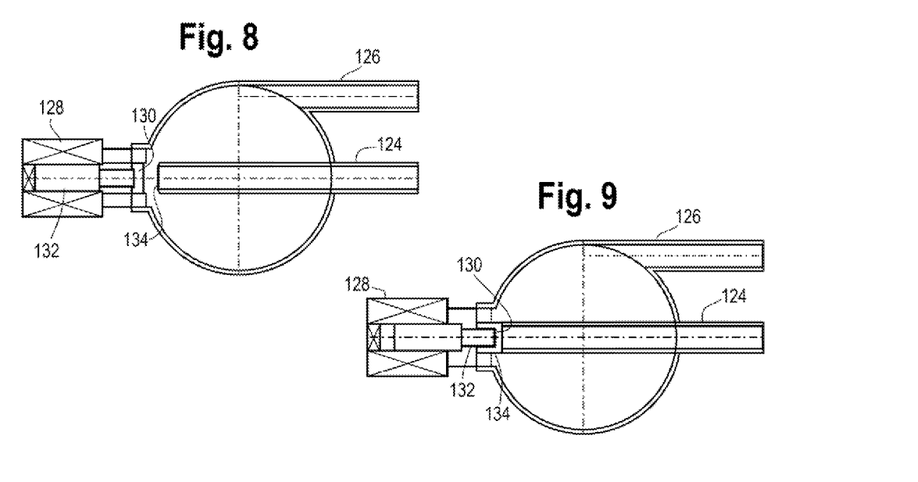
FIG. 8 is an enlarged sectional plan view of the mixing chamber of FIG. 7 showing the valve in the open position.
FIG. 9 is an enlarged sectional plan view of the mixing chamber of FIG. 6 showing the valve in the closed position.

Referring specifically to FIGS. 8 and 9, the solenoid controlled concentrate valve 122 has a fixedly mounted inlet or discharge tube 124 that may be integrally formed with the body of the mixing chamber 126. Instead of a solenoid moving the tube 124, another solenoid 128 is mounted to the mixing chamber 126 at the side opposite the discharge tube 124. When the solenoid 128 is not energized, a resilient, flexible membrane 130 holds a slidable mounted plunger, or actuator rod, 132 in an open retracted position. As seen in FIG. 8, in the open retracted position, the end 134 of the tube 124 is uncovered to allow concentrate to flow into the mixing chamber 126. When the solenoid 128 is energized, however, as seen in FIG. 9, the actuator rod 132 is forced inwardly toward the end 134 and pushes the flexible, resilient membrane 130 into a blocking, plugged relationship with the end 130 to close the end 130 against the release of concentrate.

An advantageous feature of the present invention is that the operation is obtained without the need for a microcomputer, ASICS card or other expensive and sometimes unreliable electronics. Instead, as illustrated in the functional block diagram of FIG. 10, the various functions are performed substantially independently or passively. The water pressure regulator 66 and the water flow rate regulator 68 are preferably entirely mechanical and head pressure regulation and concentrate homogenization maintenance are all achieved with simple switches, automatically actuating sensors and actuating timers operating independently but in concert.

Figure 10:
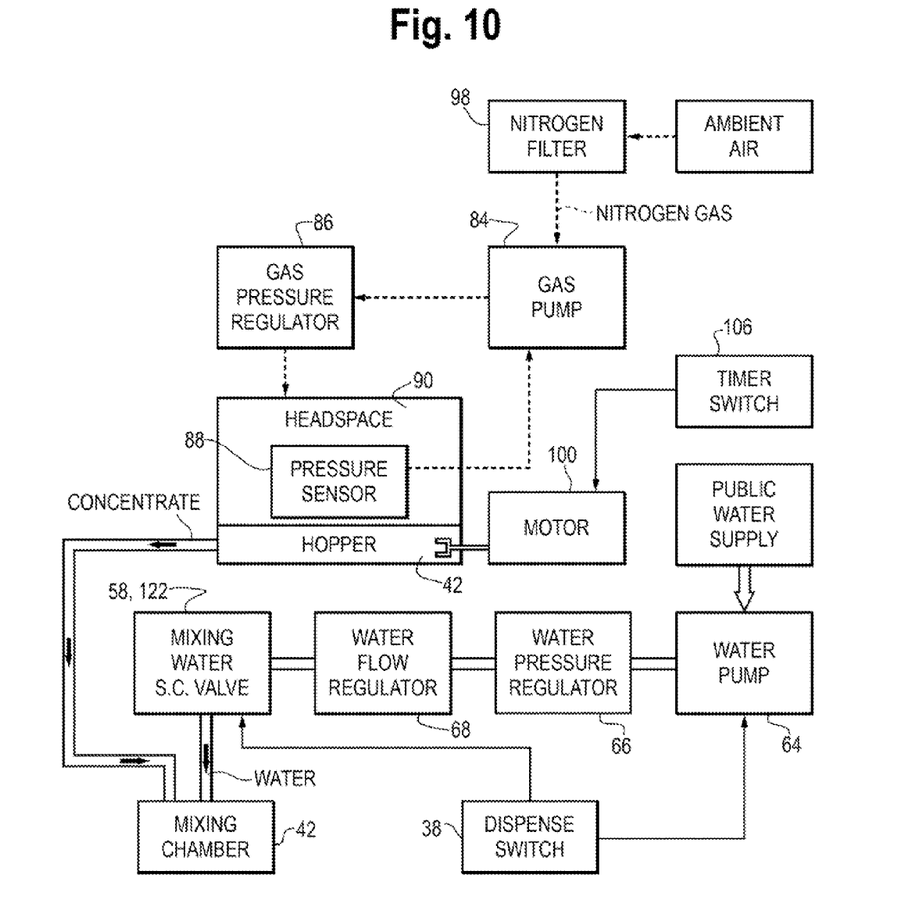
FIG. 10 is a functional block diagram of the operating systems of the drink dispenser 10.

Control of the concentrate dispense rate and thus the mixing ratio is achieved automatically each time the dispense push button switch 38 is manually actuated. The water pressure regulator 66 and the flow regulator 68 are preferably entirely mechanical and need no control signals to perform the respective functions. They are passive in the sense that they function automatically without any external controls whenever the water pump 64 is energized in response to manual actuation of the dispense push button switch 38. Both the water pressure regulator 66 and the water flow regulator 68 are manually set to preselected levels of pressure and flow rate. These preselected set levels are not changed unless manually changed when needed to accommodate a different concentrate with a different liquid viscosity or to otherwise change the mixing ratio. While the dispense switch 38 is manually held actuated, an energization signal is sent to the concentrate solenoid controlled valve 58 or 128 to open a passage to the mixing chamber 74 and another signal is sent to energize the water pump 64 and the regulators 66 and 68 function automatically in response to the pressurized water from the pump to pass the water to the mixing chamber 74 at a controlled pressure and rate.

Likewise, oxidation prevention is also automatically achieved by the passive nitrogen passing, oxygen blocking filter 98. This filter 98 only passes predominately nitrogen gas from the atmosphere to the head space 90 above the top surface of concentrate 44 whenever the gas pump 84 is energized.

The gas pump 84 is energized and controlled solely by the pressure sensor 88. After the concentrate has been added to the concentrate hopper 42, the cover 40 is manually moved from the open position, as shown in FIG. 6, to the sealed closed position shown in FIG. 7. After there has been removal to the mixing chamber 74 of some of the original amount of concentrate added to the hopper 42, a resultant decrease in pressure to a preselected minimum pressure is detected. When this preselected minimum pressure is detected, the pressure sensor generates a low pressure energization signal. The gas pump 84 begins pumping nitrogen through the nitrogen filter 98 in response to the low pressure energization signal. The gas pump 84 continues to pump nitrogen into the head space 90 until the low pressure energization signal is terminated by the pressure sensor 88 when the sensed pressure increases to a preselected maximum head pressure.

The operation of the mixing motor on the other hand is strictly controlled by the electronic periodic timer 106. The timer 106 automatically, periodically generates energization signals to the electric motor to cause the mixing blades 104 to rotate for a few minutes every few hours as may be needed. The degree of mixing is chosen to keep the concentrate from significantly separating and losing a homogenous condition needed to maintain a uniform concentrate density throughout all the contents of the hopper 42 and thus maintain a uniform concentrate flow rate and uniform flow rate.

Thus, it is seen that a concentrate mixing drink dispenser is provided that overcomes the disadvantages of know drinking dispenser that lack the novel features of the present invention. Different mixing ratios may be selected from different concentrates by selectively varying and maintaining preselected pressure and flow rates at which the mixing water enters the mixing chamber. Once these settings are established, variations in the water pressure of the public water supply do not result in varying the mixing ratio as happens in known mixing dispensers. The uniform ratio is also maintained in part by maintaining a uniform head pressure in the hopper and by maintaining the concentrate in a uniform homogenous state by periodic mixing.

The invention claimed is:

1. A mixing drink dispenser, comprising:
   a mixing chamber for receipt of mixing liquid drink concentrate with water for mixing together into a beverage, said mixing chamber having
      an upper cylindrical section with
         a cylindrical side wall,
         a water inlet connected with an elongate, tubular water inlet connector extending tangentially and laterally outwardly from the cylindrical side wall to direct a flow of streaming water tangentially and laterally against an interior surface of the cylindrical section at a first level to create a spiraling, swirling vortex of water closely covering the interior surface of the upper cylindrical section that moves downwardly along the interior surface to a second level beneath the first level, and
         a concentrate inlet directed for flow of streaming concentrate generally against the interior surface at the second level beneath the first level;
   a source of mixing water connected with the water inlet; and
   a concentrate hopper for holding liquid drink concentrate connected with a drain hole connected to the concentrate inlet.

2. The mixing drink dispenser of claim 1 in which
   the mixing chamber includes a lower section joined to a bottom of the upper cylindrical section having a drain hole with a diameter substantially smaller than a diameter of the upper cylindrical section,
   said lower section having an interior lower side surface joined to the interior surface of the upper cylindrical section at a location beneath the second level and extending inwardly and downwardly to the drain hole.

3. The mixing drink dispenser of claim 2 in which the interior lower side surface is at least a partly planer surface.

4. The mixing drink dispenser of claim 3 in which the planer side surface extends downwardly and inwardly toward the drain hole.

5. A mixing drink dispenser comprising:
   a mixing chamber for receipt of mixing liquid drink concentrate with water for mixing together into a beverage, said mixing chamber having
      an upper cylindrical section with
         a water inlet directed for flow of streaming water tangentially against an interior surface of the cylindrical section at a first level, and
         a concentrate inlet directed for flow of streaming concentrate generally perpendicularly against the interior surface at a second level beneath the first level;
   a source of mixing water connected with the water inlet, and
   a concentrate hopper for holding liquid drink concentrate connected with a drain hole connected to the concentrate inlet,
   said concentrate inlet being an open end of an elongate concentrate inlet tube located within the mixing chamber and extending from one side of the upper cylindrical section toward a side opposite the one side, and said inlet tube extending substantially across the mixing chamber to the open end, said open end being located directly opposite a concentrate inlet closure at another side of the upper cylindrical section diametrically opposite the sealed tube opening at the one side.

6. The mixing drink dispenser of claim 5 in which the inlet tube is mounted slidably mounted within a sealed tube mounting hole in the one side of the mixing chamber, and the concentrate inlet closure member is fixedly mounted to the opposite side of the upper cylindrical section and extends inwardly toward the open end of the concentrate inlet tube.

7. The mixing drink dispenser of claim 6 in which the concentrate closure member is tapered to a distal end that is smaller than the open end of the elongate concentrate inlet tube.

8. The mixing drink dispenser of claim 7 in which the fixed concentrate member is conical.

9. The mixing drink dispenser of claim 5 in which the elongate concentrate inlet tube is mounted for sliding movement within the sealed tube opening between
  an open position in which it is spaced from the inlet closure to allow flow of concentrate against the concentrate inlet closure and the other side of the upper cylindrical section, and
  a closed position in which it is pressed against the concentrate inlet closure to block receipt of concentrate within the upper section.

10. The mixing drink dispenser of claim 9 including a start switch, and means for electromechanically, slidably, moving the elongate concentrate in tube between the open position and the closed position.

11. The mixing drink dispenser of claim 5 in which the concentrate inlet closure is mounted for movement between
  a closed inward position spaced from the interior surface in which the open end of the elongate concentrate inlet tube is engaged with and blocked by the inlet closure to prevent concentrate to enter the upper cylindrical section, and
  an open position relatively flush with an interior surface of the cylindrical section in which the concentrate inlet closure is disengaged and not blocked to allow concentrate to enter the upper cylindrical section of the mixing chamber.

12. The mixing drink dispenser of claim 11 including means for electromechanically moving the concentrate inlet closure between the open position and the closed position.

13. The mixing drink dispenser of claim 11 in which the concentrate inlet closure includes an opening in the interior surface of the cylindrical section, a flexible membrane overlying and sealing closed the opening, and a member for moving the flexible membrane into engagement with the open end of the elongate concentrate inlet tube to block passage of concentrate through the open end of the concentrate inlet tube.

14. The mixing drink dispenser of claim 13 in which the flexible membrane is resilient and automatically returns to a position spaced from the open end of the elongate concentrate inlet tube when not being held in engagement with the open end by the moving member.

15. The mixing drink dispenser of claim 14 including means for electromechanically moving the flexible member.

16. The mixing drink dispenser of claim 1 including a flow regulator for regulating the flow rate to a preselected rate of mixing water streaming into the mixing chamber, and a pressure regulator for regulating the pressure to a preselected pressure of the water streaming into the mixing chamber.

17. The mixing drink dispenser of claim 16 in which the flow rate of the concentrate into the mixing chamber and ratio of concentrate to mixing water is determined at least in part by each of
  the preselected regulated flow rate,
  the preselected regulated water pressure,
  swirling of the mixing water around the interior surface of the cylindrical section,
  relative pressures created within the mixing chamber due to the entry of the mixing water, and
  Venturi effect and an unfettered open connection between the concentrate inlet and the drain hole of the concentrate hopper.

18. The mixing drink dispenser of claim 16 including means for selectively changing the preselected flow rate to change the ratio of concentrate to mixing water.

19. The mixing drink dispenser of claim 18 including means for selectively changing the preselected pressure to change the ratio of concentrate to mixing water.

20. The mixing drink dispenser of claim 16 including means for selectively changing the preselected pressure to change the ratio of concentrate to mixing water.

21. The mixing drink dispenser of claim 1 in which the water inlet is an opening in flush relationship with an interior surface of the cylindrical side wall of the upper cylindrical section.

22. The mixing drink dispenser of claim 1 in which the concentrate inlet is located at the open end of an elongate tube located within the cylindrical section and extending in a substantially radial direction substantially entirely across the cylindrical section.

23. The mixing drink dispenser of claim 1 in which the cylindrical side wall of the upper cylindrical section of the mixing chamber has a top and both the water inlet and the concentrate inlet are located in the cylindrical side wall and near the top.

24. The mixing drink dispenser of claim 23 in which the water inlet in the cylindrical sidewall is laterally spaced from the concentrate inlet in the cylindrical sidewall.

25. The mixing drink dispenser of claim 24 in which the water inlet is spaced approximately 90-radian degrees away from the interior surface against which the steaming concentrate flows.

26. The mixing drink dispenser of claim 1 including a start switch, a solenoid controlled water valve connected between the source of mixing water and the water inlet responsive to actuation of the start switch to assume an open state to allow the unfettered, free flow of water into the mixing chamber, another solenoid controlled water valve connected between the concentrate hopper and concentrate inlet responsive to actuation of the start switch to assume an open state to allow the unfettered, free flow of concentrate into the mixing chamber.

27. A method of mixing and dispensing a mixed drink with a mixing drink dispenser, comprising the steps of:

injecting mixing water from a source of water through a tangentially directed water inlet in a cylindrical side of an upper cylindrical section of a mixing chamber against and along an interior surface of the cylindrical section at a first level to create a spiraling flow of streaming water around the interior cylindrical surface; and injecting liquid concentrate from a concentrate hopper though a concentrate inlet in a cylindrical side of the mixing chamber directed for flow of streaming concentrate generally radially against the interior surface at a second level beneath the first level; and mixing the water with the concentrate along the interior surface as the spiraling flow of streaming water moves downwardly along the interior surface from the first level to the second level to mix with the concentrate on the interior surface.

28. The mixing drink dispenser of claim 1 in which mixing of the mixing water with the concentrate is achieved solely by means of the flowing of concentrate and mixing water within the mixing chamber without the use of any other means for mixing.

29. The method of claim 27 in which mixing of the mixing water with the concentrate is achieved solely by means of the flowing of concentrate and mixing water within the mixing chamber without the use of any other means for mixing.

\* \* \* \* \*